United States Patent Office 3,021,375
Patented Feb. 13, 1962

3,021,375
PROCESS FOR THE PREPARATION OF 2,4-BIS-(CHLOROMETHYL)-TOLUENE
Ted Henry Waid, Montreal, Quebec, and Denis Coleman, Westmount, Quebec, Canada, assignors to Monsanto Canada Limited, La Salle, Quebec, Canada
No Drawing. Filed Jan. 9, 1959, Ser. No. 785,803
6 Claims. (Cl. 260—651)

This invention relates to a process for the preparation of a group of substituted benzene compounds of which important members are 2,4-bis-(chloromethyl)-toluene and 2,5-bis-(chloromethyl)-p-xylene.

This group of compounds has the general formula

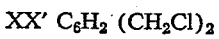

wherein X and X' are selected from the group consisting of hydrogen and alkyl, at least one of X and X' being alkyl.

2,4-bis-(chloromethyl)-toluene, a member of this group, is represented by the structural formula

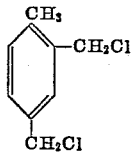

It is a particularly useful product. It serves as an intermediate in chemical syntheses, having very reactive chloride atoms in the side-chains. It also serves as a starting material in the preparation of a large number of high molecular weight polymers useful as resins and their converted products, for example, synthetic fibers.

The yields of bis-(chloromethyl)-toluene obtained normally by chloromethylation of toluene are quite low and usually vary between about 2 and about 5% regardless of what chloromethylating agents are employed. Usual agents are dichloromethyl ether and zinc chloride or formaldehyde, hydrochloric acid and zinc chloride. The low yields appear to result from side reactions of the Friedel-Crafts type, promoted by normal reaction conditions or excessive amounts of zinc chloride catalyst or both. The side reactions lead to the formation of di-p-tolylmethane, chloromethyltolyltolylmethane and other higher condensation products, thus decreasing the yields of mono- and bis-(chloromethyl)-toluene.

APPLICANTS' DEVELOPMENT

The present invention provides a process of chloromethylating substituted aromatic compounds having the formula

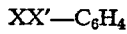

in which X and X' are selected from the group consisting of hydrogen and alkyl and in which at least one of these groups is alkyl, the alkyl group or groups preferably containing from 1 to 4 carbon atoms. According to the invention the reaction provides major amounts of a dichloromethylated aromatic hydrocarbon and minor amounts of a mono-chloromethylated aromatic hydrocarbon. Products of specific utility produced by the invention are 2,4-bis-(chloromethyl)-toluene and 2,5-bis-(chloromethyl)-p-xylene. The reaction is effective to reduce the amount of undesired products.

The process of the invention will be more specifically described in terms of the production of bis-(chloromethyl)-toluene. This product can be derived from toluene by suspending paraformaldehyde or trioxymethylene and zinc chloride in an appropriate solvent or diluent for example chloroform, methylene dichloride, sym.-tetrachloroethane, cyclohexane, and preferably carbon tetrachloride, and saturating the suspension with hydrochloric acid until all paraformaldehyde or trioxymethylene has depolymerized. Toluene is then added and the reaction is continued at a temperature within the range from about 30° C. to about 80° C. for a period of from about five to about fourteen hours, preferably at from about 65° C. to about 70° C. for about eight to about nine hours. Lower reaction temperatures correspond to longer times, and vice versa. The amount of undesirable side products are decreased to a surprising extent.

A catalyst is necessary to the reaction. Zinc chloride is particularly effective. An optimum ratio of zinc chloride to toluene should be used in the present invention, this ratio depending on the temperature of the reaction. Within the temperature range 30° C. to 80° C., from about 0.50 to about 0.70 mole of catalyst per mole of toluene gives excellent results. Higher molar ratios of catalyst to the aromatic hydrocarbon correspond to lower reaction temperatures, and vice versa. Excessive catalyst concentration causes unwanted condensation reactions. The reaction rate increases with rise in temperature, but higher reaction temperatures, even in the presence of small amounts of catalyst, favour the formation of undesired condensation products.

By starting with the appropriate substituted aromatic compound, however, other members of the above defined group may be derived by a similar procedure in which the conditions are analogous.

For example, other aromatic hydrocarbons of the formula

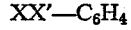

may be reacted in the same way as toluene in the above procedure and in accordance with the following reaction

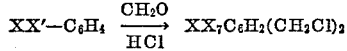

The conditions of the reaction are the same for other aromatic hydrocarbons of the formula as they are for toluene.

As examples illustrating the invention, the following preferred procedures are given:

Example 1

A three-way flask equipped with an efficient stirrer, a return condenser, a thermometer and a gas inlet tube was charged with 66 parts trioxymethylene, 45 parts anhydrous zinc chloride and 450 parts carbon tetrachloride. The mixture was stirred vigorously and as a rapid stream of hydrochloric acid was introduced, the temperature rose spontaneously to 38° C. The temperature was then raised to 60° C. by application of external heat and all trioxymethylene depolymerized within ten minutes. Then while stirring, 92 parts of toluene was added, the temperature was raised to 65–70° C. and the mixture was maintained saturated with hydrochloric acid for nine hours. On completion of the reaction 80 cc. of water was added in order to dissolve the zinc chloride slurry. The organic layer was separated, and the aqueous solution was washed with 30 parts of carbon tetrachloride. The organic phase and the extract was combined and washed once with 10% sodium bicarbonate solution until slightly alkaline reaction to litmus. The solution was dried over anhydrous sodium sulfate. The solvent and a very small amount of unreacted toluene were then removed by distillation at a pressure somewhat less than atmospheric. The residue was transferred to a suitable, non-ferrous distilling apparatus equipped with a suitable fractionation column. The residue was then fractionated at reduced pressure and gave the following products:

| | Parts |
|---|---|
| Monochloromethyltoluene | 25.4 |
| 2,4-bis-(chloromethyl)-toluene | 117.5 |
| Residue | 19.8 |

The boiling points at 7 millimeters of mercury pressure of the products referred to are given below:

Monochloromethyltoluene _____ 90–93° C.
2,4-bis-(chloromethyl)-toluene _____ 133–135° C.

The 2,4-bis-(chloromethyl)-toluene, present in high yields, was then purified by crystallization. Any suitable solvent such as petroleum ether, n-hexane, n-pentane, etc. could be used. The pure compound had a melting point of 43–43.5° C.

Monochloromethylated product could be recycled in a suitable manner during the chloromethylation of further amounts of toluene or could be chloromethylated further thereby increasing the yield of the desired product, the 2,4-bis-(chloromethyl)-toluene.

*Example 2*

This example illustrates the advantage of chloromethylating further the monochloromethylated product thus increasing the overall yield of 2,4-bis-(chloromethyl)-toluene.

A mixture of 140.5 parts monochloromethyltoluene, 34.5 parts trioxymethylene, 26.6 parts zinc chloride and 600 parts recovered carbon tetrachloride was allowed to react at 65 to 70° C. over a period of five hours as in Example 1. Upon distillation of the crude reaction product the following fractions were obtained:

|  | Parts |
|---|---|
| 2,4-bis-(chloromethyl)-toluene | 112.5 |
| Monochloromethyltoluene | 27 |
| Residue | 23 |

*Example 3*

This example as compared with Example 1 illustrates the influence of the reaction time on yields of resulting products, the overall conversion of toluene to the useful chloromethylated products being very high.

The procedure of Example 1 was followed, but the reaction time was six instead of nine hours. Upon distillation the following products were obtained:

|  | Parts |
|---|---|
| Monochloromethyltoluene | 55 |
| 2,4-bis-(chloromethyl)-toluene | 78.5 |
| Residue | 10.2 |

*Example 4*

Examples 4, 5 and 6, as compared with Example 1, illustrate the importance of an appropriate solvent or diluent and of other various reaction conditions with regard to the yields of the useful 2,4-bis-(chloromethyl)-toluene and undesired condensation products, such as di-p-tolylmethane.

A mixture of 880 parts toluene, 66 parts trioxymethylene and 37.5 parts zinc chloride was allowed to react at 50° C. over a period of one and a half hours as in Example 1. Upon distillation of the crude reaction product the following fractions were obtained:

|  | Parts: |
|---|---|
| Monochloromethyltoluene | 220 |
| Di-p-tolylmethane | 42.2 |

*Example 5*

A mixture of 880 parts toluene, 66 parts trioxymethylene and 33 parts zinc chloride was allowed to react at 60° C. over a period of half an hour as in Example 1. Upon fractional distillation of the reaction product the following products were obtained:

|  | Parts |
|---|---|
| Monochloromethyltoluene | 253 |
| 2,4-bis-(chloromethyl)-toluene | 22 |

*Example 6*

A mixture of 92 parts toluene, 243 parts 37% formalin solution, 460 parts concentrated hydrochloric acid and 18 parts zinc chloride was allowed to react at 75° C. for fifteen hours as in Example 1. Upon distillation the following products were obtained:

|  |  |  |
|---|---|---|
| Monochloromethyltoluene | parts | 160.0 |
| 2,4-bis-(chloromethyl)-toluene | do | 18.5 |
| Residue |  | Trace |

*Example 7*

This example shows that the process may also be applied beneficially to the preparation of 2,5-bis-(chloromethyl)-p-xylene. The best yield of this compound reported in the literature is 55% with an inconveniently long reaction time of 45 hours. (J. H. Wood et al. J.A.C.S., 2989, 72, 1950) using the improved method, with only 9 hours reaction time a yield of 80.0% of 2,5-bis-(chloromethyl)-p-xylene was obtained.

A mixture of 212 parts of p-xylene, 132 parts of trioxymethylene, 90 parts of zinc chloride, and 600 parts of carbon tetrachloride was allowed to react at 65 to 70° C. over a period of 9 hours as in Example 1. The mixture was concentrated by evaporation of carbon tetrachloride on the steam bath, washed several times with water, dissolved in petroleum ether, dried over anhydrous sodium sulfate and filtered. On concentrating the solution 325 parts of 2,5-bis-(chloromethyl)-p-xylene crystallized out. On recrystallization from petroleum ether, the product had a melting point of 134° C. (cf. J. H. Wood et al. loc. cit.).

We claim:

1. A process for the production in major amounts of a member of the group consisting of 2,4-bis-(chloromethyl)-toluene and 2,5-bis-(chloromethyl)-p-xylene by chloromethylation of an aromatic hydrocarbon having the formula $$CH_3C_6H_4X$$

in which X is a member of the group consisting of hydrogen, methyl and chloromethyl, which comprises depolymerizing a polymer of the group consisting of paraformaldehyde and trioxymethylene by suspending said member in an amount in excess of the theoretical amount of the aromatic hydrocarbon to be reacted and zinc chloride in a ratio of about 0.2 mole to about 0.7 mole per mole of the aromatic hydrocarbon in an inert diluent, saturating the suspension with hydrochloric acid, following depolymerization bringing together the inert diluent mixture and said aromatic hydrocarbon and continuing the reaction at a temperature of from about 30° C. to about 80° C. to form major amounts of the dichloromethylated hydrocarbon.

2. A process for the production in major amounts of 2,4-bis-(chloromethyl)-toluene by dichloromethylation of toluene which comprises depolymerizing a polymer selected from the group consisting of paraformaldehyde and trioxymethylene by suspending it in an amount in excess of the theoretical amount of toluene to be reacted and zinc chloride in a ratio of about 0.2 mole to about 0.7 mole per mole of toluene in an inert diluent, saturating the suspension with hydrochloric acid, following depolymerization bringing together the inert diluent mixture and toluene and continuing the reaction at a temperature of from about 30° C. to about 80° C. to form major amounts of 2,4-bis-(chloromethyl)-toluene.

3. A process, as described in claim 2, in which the polymer is trioxymethylene.

4. A process, as described in claim 2, in which the polymer is paraformaldehyde.

5. A process for the production of major amounts of 2,4-bis-(chloromethyl)-toluene by chloromethylation of monochloromethyl-toluene which comprises depolymerizing paraformaldehyde by suspending it in an amount in excess of the theoretical amount of monochloromethyltoluene to be reacted and zinc chloride in a ratio of about 0.2 mole to about 0.7 mole per mole of monochloromethyltoluene in an inert diluent, saturating the suspension with hydrochloric acid, following depolymerization bringing together the monochloromethyl-toluene and continuing the reaction at a temperature of from about 30° C. to about 80° C. to form major amounts of 2,4-bis-(chloromethyl)-toluene.

6. A process for the production in major amounts of 2,5-bis-(chloromethyl)-p-xylene by dichloromethylation of p-xylene which comprises depolymerizing paraformaldehyde by suspending it in an amount in excess of the theoretical amount of p-xylene to be reacted and zinc chloride in a ratio of about 0.2 mole to about 0.7 mole per mole of p-xylene in an inert diluent, saturating the suspension with hydrochloric acid, following depolymerization adding p-xylene and continuing the reaction at a temperature of from about 30° C. to about 80° C. to form major amounts of 2,5-bis-(chloromethyl)-p-xylene.

References Cited in the file of this patent

UNITED STATES PATENTS

| | | |
|---|---|---|
| 1,727,682 | Tschunkur et al. | Sept. 10, 1929 |
| 2,219,873 | Pinkernelle | Oct. 29, 1940 |
| 2,516,971 | Galitzenstein et al. | Aug. 1, 1950 |
| 2,714,125 | Gerner | July 26, 1955 |
| 2,850,542 | Heisenberg et al. | Sept. 2, 1958 |
| 2,868,821 | Lotz | Jan. 13, 1959 |
| 2,964,573 | De Pierri et al. | Dec. 13, 1960 |